United States Patent
Kim et al.

(10) Patent No.: US 9,294,971 B2
(45) Date of Patent: Mar. 22, 2016

(54) METHOD AND APPARATUS FOR CONTROLLING UPLINK TRANSMISSION POWER OF USER EQUIPMENT

(71) Applicant: Samsung Electronics Co., Ltd., Gyeonggi-do (KR)

(72) Inventors: Sang Bum Kim, Gyeonggi-do (KR); Soeng Hun Kim, Gyeonggi-do (KR); Jae Hyuk Jang, Gyeonggi-do (KR); Kyeong In Jeong, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 14/385,490

(22) PCT Filed: Mar. 13, 2013

(86) PCT No.: PCT/KR2013/002002
§ 371 (c)(1),
(2) Date: Sep. 15, 2014

(87) PCT Pub. No.: WO2013/137635
PCT Pub. Date: Sep. 19, 2013

(65) Prior Publication Data
US 2015/0072690 A1    Mar. 12, 2015

(30) Foreign Application Priority Data
Mar. 14, 2012  (KR) ......................... 10-2012-0026032

(51) Int. Cl.
*H04W 52/14*    (2009.01)
*H04W 36/00*    (2009.01)
(Continued)

(52) U.S. Cl.
CPC ...... *H04W 36/0072* (2013.01); *H04W 36/0094* (2013.01); *H04W 52/146* (2013.01); *H04W 52/242* (2013.01); *H04W 52/244* (2013.01); *H04W 88/08* (2013.01)

(58) Field of Classification Search
CPC .................... H04W 36/0072; H04W 36/0094; H04W 52/146; H04W 52/242; H04W 52/244; H04W 52/24; H04W 52/241; H04W 52/246; H04W 52/248; H04W 52/18; H04W 52/38; H04W 52/40; H04W 52/283
USPC .......... 455/437, 436, 440, 442, 444, 522, 524
See application file for complete search history.

(56) References Cited

U.S. PATENT DOCUMENTS

2011/0194513 A1*  8/2011  Kim ............................... 370/329
2012/0213092 A1*  8/2012  Sun et al. ....................... 370/248
(Continued)

FOREIGN PATENT DOCUMENTS

| KR | 10-2005-0020547 | 3/2005 |
| KR | 10-2009-0034551 | 4/2009 |
| KR | 10-2010-0112329 | 10/2010 |

OTHER PUBLICATIONS

International Search Report dated Jun. 27, 2013 in connection with International Patent Application No. PCT/KR2013/002002, 4 pages.
(Continued)

*Primary Examiner* — Siu Lee

(57) ABSTRACT

The present invention relates to a method and an apparatus for controlling uplink transmission power of a user equipment. In the method, a serving base station receives from the user equipment a signal measurement report for a first neighboring base station transmitting the strongest signal to the user equipment, transmits, to the user equipment, a control signal including a path loss information for calculating the uplink transmission power, transmits, to the user equipment and the first neighboring base station scheduling information for the user equipment and receives, from the first neighboring base station, an uplink signal of the user equipment. According to the method, the uplink transmission power can be adjusted based on a pico base station close to the user equipment when the macro base station is a serving base station such that the amount of interference power of a multi cell may be minimized.

22 Claims, 7 Drawing Sheets

(51) Int. Cl.
*H04W 52/24* (2009.01)
*H04W 88/08* (2009.01)

(56) References Cited

U.S. PATENT DOCUMENTS

2012/0270536 A1* 10/2012 Ratasuk et al. ............... 455/423
2014/0036786 A1* 2/2014 Kazmi et al. .................. 370/329
2014/0141830 A1* 5/2014 Skov et al. .................... 455/522
2014/0219152 A1* 8/2014 Anto et al. .................... 370/311

OTHER PUBLICATIONS

Written Opinion of International Searching Authority dated Jun. 27, 2013 in connection with International Patent Application No. PCT/KR2013/002002, 5 pages.

* cited by examiner

METHOD AND APPARATUS FOR CONTROLLING UPLINK TRANSMISSION POWER OF USER EQUIPMENT

TECHNICAL FIELD

The present invention relates to a method for controlling uplink transmission power of user equipment and an apparatus supporting the same, and more particularly, to a method and an apparatus for reducing the amount of interference power in a heterogeneous network environment by efficiently controlling uplink transmission power of user equipment.

BACKGROUND ART

Generally, a mobile communication system has been developed for the purpose of providing communication while ensuring the mobility of a user. Thanks to a rapid development of technology, such mobile communication system has reached a stage capable of providing a high-speed data communication service as well as a voice communication.

In recent years, as one of the next generation mobile communication system, a standardization for Long Term Evolution (LTE) has been progressed in 3GPP. The LTE aims at commercialization by 2010, which is a technology that implements a high-speed packet-based communication having a transmission speed of maximum about 100 Mbps higher than currently available data transfer rate. To this end, various methods have been discussed, for example, a method of reducing the number of nodes positioned on a channel by simplifying the structure of network, or a method of enabling radio protocols to approach a radio channel as far as possible is under discussion.

In the meantime, in a data service unlike a voice service, resources that can be allocated is determined according to the amount of data to be transmitted and a channel condition. Therefore, a wireless communication system such as a mobile communication system performs management such as allocation of transmission resources with consideration for the amount of resource to be transmitted by scheduler, the channel condition, and the amount of data. This is also performed in the LTE which is one of the next-generation mobile communication systems in the same manner, and the scheduler located in the base station manages and allocates wireless transmission resources.

Recently, a discussion on an evolved LTE communication system (LTE-Advanced, LTE-A) that improves transmission speed by grafting various new technologies onto the LTE communication system has been started. Among the new technologies to be introduced, some technologies take a Heterogeneous Network (Hetnet) environment into consideration.

The Hetnet refers to a wireless network composed of a multi-cell i.e., cells that have various sizes and performances such as a macro cell, a pico cell, a femto cell, and the like. Such various types of cells may be organically and effectively interworked, thereby providing the best service to an user equipment. In the Hetnet environment, according to the mobility of the user equipment, a hand-over technology may be improved to obtain optimum performance, and a service area of the picocell or the femtocell may be adjusted by properly scheduling radio resources. In addition, a signal of one user equipment may be received by a plurality of base stations or a receiver to improve reception performance.

DISCLOSURE OF INVENTION

Technical Problem

The present invention is made to solve the above problems. In particular, the present invention may provide a method and an apparatus that can adjust an uplink transmission power based on a neighboring small base station when an user equipment is close to the small base station such as pico base station while a macro base station is a serving cell.

Furthermore, the present invention further provides a method and an apparatus that enables the small base station to receive uplink signal of the user equipment and forward it to the macro base station, thereby maintaining a Qos of the user equipment and minimizing the amount of interference power affecting another cell.

Solution to Problem

In accordance with an aspect of the present invention, a method for a serving base station controlling uplink transmission power of user equipment includes: receiving from the user equipment a signal measurement report with respect to a first neighboring base station, which transmits the strongest signal to the user equipment; transmitting to the user equipment a control signal including a path loss value, which is to be used for calculating the uplink transmission power; transmitting to the user equipment and the first neighboring base station scheduling information with respect to the user equipment; and receiving from the first neighboring base station an uplink signal of the user equipment which the first neighboring base station has received.

In accordance with another aspect of the present invention, a method for controlling uplink transmission power of user equipment includes: transmitting to a serving base station a signal measurement report with respect to a first neighboring base station which transmits the strongest signal to the user equipment; receiving from the serving base station a control signal including a path loss value which is to be used for calculating the uplink transmission power; calculating the uplink transmission power by applying the path loss value; receiving scheduling information from the serving base station; and transmitting an uplink signal by applying the uplink transmission power.

In accordance with another aspect of the present invention, an apparatus for a serving base station controlling uplink transmission power of user equipment includes: a transceiver to transmit and receive a signal to/from an user equipment; and a controller to control to receive from the user equipment a signal measurement report with respect to a first neighboring base station, which transmits the strongest signal to the user equipment, transmit to the user equipment a control signal including a path loss value, which is to be used for calculating the uplink transmission power, transmit to the user equipment and the first neighboring base station scheduling information with respect to the user equipment, and receive from the first neighboring base station an uplink signal of the user equipment which the first neighboring base station has received.

In accordance with another aspect of the present invention, an apparatus for controlling uplink transmission power in user equipment includes: a transceiver to transmit and receive a signal to/from a base station and perform signal measurement with respect to a serving base station or a neighboring base station; and a controller to control to transmit to the serving base station a signal measurement report with respect to a first neighboring base station which transmits the strongest signal to the user equipment, receive from the serving base station a control signal including a path loss value which is to be used for calculating the uplink transmission power, calculate the uplink transmission power by applying the path loss value, receive scheduling information from the serving base station, and transmit an uplink signal by applying the uplink transmission power.

Advantageous Effects of Invention

According to the present invention, the uplink transmission power can be adjusted based on a pico base station that is close to the user equipment when the macro base station is a serving base station such that the amount of interference power of multi cell may be minimized.

Further, according to the present invention, a macro base station can receive the uplink signal of the user equipment from the pico base station, thereby maintaining a reception Qos of the user equipment regardless of the adjustment of uplink transmission power.

BRIEF DESCRIPTION OF THE DRAWINGS

The objects, features and advantages of the present invention will be more apparent from the following detailed description in conjunction with the accompanying drawings, in which.

MODE FOR THE INVENTION

Embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

In this specification, a contiguous range refers to an area that exceeds a service coverage of a base station while considerably coming close to the service coverage, such that, if an user equipment exists in the area, a transmission power of user equipment may serve as a source of interference for the base station. In the present invention, a small base station means low power nodes such as Remote Radio Head (RRH), pico, femto, and relay, and the like. Further, in this specification, a pico cell is illustrated as the small base station, but it should be noted that it is not limited thereto.

The present invention relates to a method and an apparatus for reducing the amount of interference power in a heterogeneous network (HetNet) environment by efficiently controlling uplink transmission power of user equipment.

In the HetNet environment in which different types of cells are mixed, inter-cell interference may occur due to a difference in transmission power of a macro base station and a small base station. Therefore, it is required to reduce the amount of interference power.

The present invention, when the macro base station having a large service area and the small base station having a smaller service area are mixed, presents a method of minimizing the transmission power of the user equipment to reduce the amount of interference power through a cooperation of the macro base station and the small base station.

Figure 1:
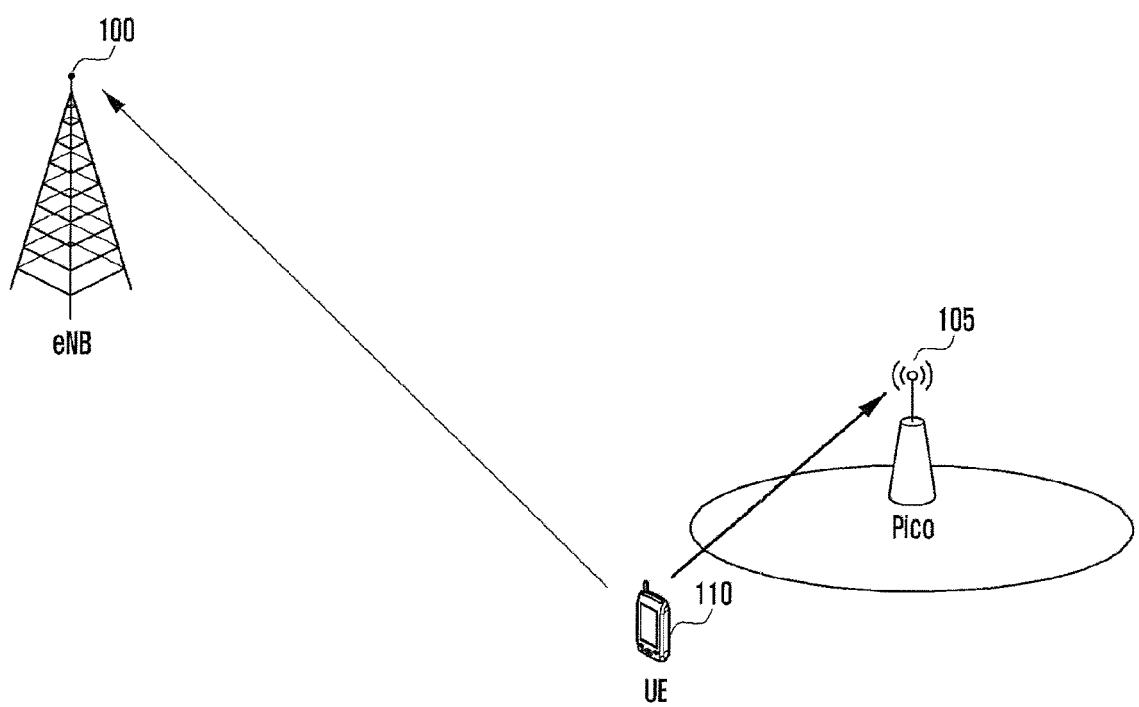
FIG. 1 is a diagram illustrating an interference that may occur when a macro-cell and a pico-cell are mixed in a heterogeneous network environment.

FIG. 1 is a diagram illustrating an interference that may occur when a macro-cell and a pico cell are mixed in a heterogeneous network environment.

The macro cell base station 100 has a wide service area of about 1 km. On the other hand, the service area of the pico cell base station 105 is only 500 m or less. In the meantime, the user equipment shown in FIG. 1, which is a serving cell, is connected to the macro cell, but exists in a contiguous range of the pico base station.

As shown in FIG. 1, when the user equipment 100, which is located close to the pico base station 110 while being quite a distance away from the macro cell base station, is connected to the macro cell base station to perform communication, the transmission power of the user equipment may serve as a source of interference with respect to the small base station. In this case, the user equipment 110 attempts to perform communication by setting a relatively high transmission power in order to meet a minimum power requirement received by the macro cell base station.

This high transmission power may serve as a large interference source for the pico cell base station 105 which is located in a short distance, such that it can interfere the communication between the pico cell base station and the user equipment of which the serving is the pico cell base station. This interference may be a factor that eventually decreases communication quality, and limits capacity.

In the Hetnet scenario, a signal of one user equipment may be received by a plurality of base stations or receivers. In the present invention, the macro cell base station and the picocell base stations may be organically interworked, such that the pico cell base station may receive a signal of the user equipment even if the user equipment is connected to the macro cell base station, and may forward the signal to the macro cell base station.

In the present invention, the part of receiving the signal of the user equipment by a plurality of base stations is similar to a conventional soft hand over technology. However, the soft handover technology is inherently made to support mobility of the user equipment, such that signals received from each base station are combined in a controller that controls the base stations.

On the other hand, in the present invention, the signal of the user equipment received by the base station other than the serving base station may be forwarded to the serving base station. That is, the picocell base station may serve as a type of repeater of macro cell. In addition, the macro cell base station may process both a control of the amount of transmission power of user equipment and a control of receiving the signal of the user equipment by the pico cell base station.

When the user equipment is located around the pico cell, the channel state into the pico cell may be better than the macro cell. Even though the serving cell of the user equipment is the macro cell, if the pico cell base stations can receive a signal of the user equipment, the pico cell may be able to receive the signal of the user equipment better than the macro cell.

At this time, if the pico cell receives the signal of user equipment to forward to the macro cell base station, the reception QoS of corresponding user equipment is not changed even when the amount of uplink power of the user equipment is adjusted based on the pico-cell. Further, the amount of uplink interference that the signal of the corresponding user equipment affects other cell of the wireless network will be reduced.

The amount of uplink transmission power of the user equipment in the conventional LTE system may be calculated by the following equation.

[Equation 1]

$$P_{PUSCH,c}(i) = \min\begin{Bmatrix} P_{CMAX,c}(i), \\ 10\log_{10}(M_{PUSCH,c}(i)) + P_{o\_PUSCH,} \begin{matrix} c(j) + \alpha_c(j) \cdot PL_c + \\ \Delta_{TF,c}(i) + f_c(i) \end{matrix} \end{Bmatrix}$$

The amount of transmission power $P_{PUSCH,c}(i)$ of i-th PUSCH subframe in the serving cell c may be calculated by a maximum reverse transmission power $P_{CMAX,c}(i)$, the number of resource blocks $M_{PUSCH,c}(i)$, a power offset $\Delta_{TF,c}$ derived from MCS, a path loss $PL_c$, and $f_c(i)$ (accumulated TPC commands).

The $P_{PUSCH,c}(i)$ may not exceed the maximum reverse transmission power $P_{CMAX,c}(i)$. The $f_c(i)$ of the above Equation is an accumulation value of Transmission Power Control of the serving cell c. $P_{O\_PUSCH,C}$ is a parameter in the upper layer, and is composed of a sum of cell-specific and UE-specific values. Typically, a different value is applied to $P_{O\_PUSCH,C}$ depending on the type of Physical Uplink Shared Channel (PUSCH) transmission such as semi-persistent scheduling, dynamic scheduling, and random access response, and the like.

The $\alpha_c$ is a 3-bit cell-specific value provided in the upper layer, and is a weight applied to a path loss when calculating the output of the reverse transmission. That is, as the $\alpha_c$ value becomes higher, the path loss more affects the reverse transmission output, and the value applied according to the type of PUSCH transmission is limited. The j value is used to indicate the type of PUSCH. When j=0, it indicates semi-persistent scheduling, when j=1, it indicates dynamic scheduling, and when j=2, it indicates random access response, respectively.

In the above Equation, $PL_c$ is a path loss of cell, and the path loss used to determine the output of reverse transmission applies a path loss of the forward channel of a corresponding cell.

The path loss of the $PL_c$ of the related art applies a path loss of the forward channel of a serving macro cell. However, in the Hetnet environment, when the user equipment is located around the pico cell, and the pico cell base station can receive signals of the user equipment, the reception QoS of corresponding user equipment can be satisfied even if the path loss of the forward channel of the pico cell is applied. This means that the transmission power of user equipment is reduced and, at the same time, that the uplink interference amount of the signal of the user equipment that affects other cell of the wireless network is reduced.

The present invention suggests the interworking of the macro cell base station and the pico cell base station in which the pico cell base station may receive signals of the user equipment connected to the macro cell base station to distinguish the received signals, and forward the received signals to the macro cell base station.

Here, the macro cell base station may determine the path loss value $PL_c$ used in the calculation of the transmission power of user equipment based on measurement information of pico cell reported by the user equipment. That is, it is determined whether to apply the path loss of the forward channel of macro cell, or apply the path loss of the forward channel of pico cell, as $PL_c$. In addition, it is determined that even though the pico cell base station receives the signal of user equipment to forward to the macro cell base station, the transmission power of PUCCH for transmitting a control signal can be still received by the macro cell base station.

Figure 2:
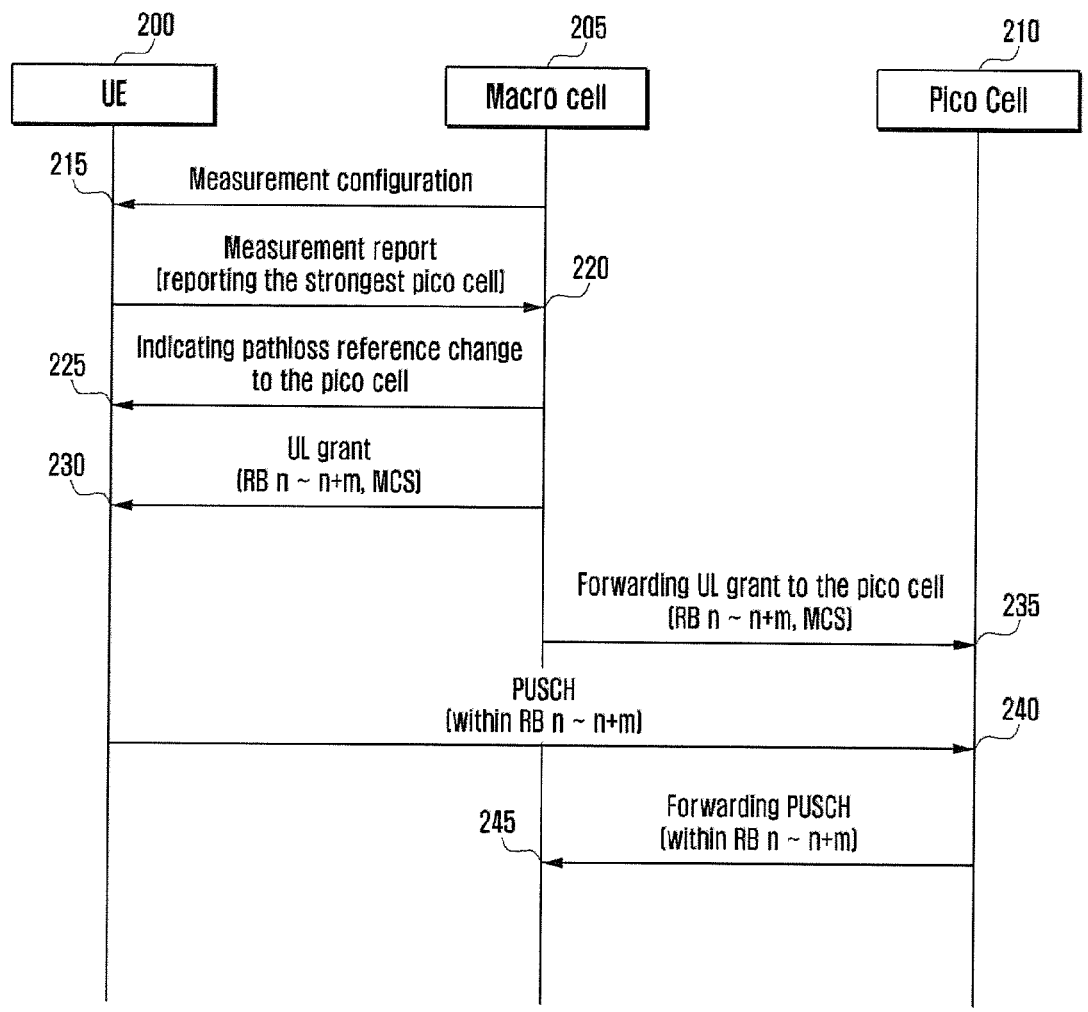
FIG. 2 is a flowchart illustrating a process of controlling an uplink transmission power of user equipment among a macro base station, an user equipment, and a small base station according to an embodiment of the present invention.

FIG. 2 is a flowchart illustrating a process of controlling an uplink transmission power of user equipment among a macro base station, an user equipment, and a small base station according to an embodiment of the present invention.

In the embodiment of the present invention shown in FIG. 2, a macro base station (macro cell) 205 may indicate an user equipment 200 to apply the path loss of the forward channel of the pico cell as a $PL_c$ value. This may be applied to the case in which the user equipment moves around the pico cell.

At step 215, the macro base station 205 may indicate the user equipment 200 to measure the neighboring pico cell. At this time, in order to easily distinguish the pico cell, the macro base station 205 may separately allocate physical cell identification (PCI) for only the pico cell.

At step 220, the user equipment may report a cell having the largest signal strength among neighboring pico cells to the macro base station 205. Then, on the basis of the reported measurement information, the macro base station 205 may determine whether to apply the path loss of the forward link of the pico cell as the $PL_c$ value used for the calculation of the amount of transmission power of user equipment.

When the macro base station 205 determines to apply the path loss of the forward link of the pico cell as the PLc value, the macro base station 205 may indicate this to the user equipment 200 at step 225. Thereafter, when calculating the uplink transmission power, the user equipment 200 applies the path loss value of pico cell as the PLc value.

At step 230, the macro base station 205 may send scheduling information to the user equipment 200 so that the user equipment may transmit the uplink information. Such scheduling information may include Radio Block (RB) and MCS, and the like.

At the same time, at step 235, the macro base station 205 may also provide the same scheduling information to the pico base station (pico cells) 210, because the pico base station 210 should receive a signal of corresponding user equipment 200. Since the transmission power of user equipment is determined to be received in the pico cell, the pico cells should be able to receive a corresponding signal of user equipment, and step 235 is intended for this.

At step 240, the user equipment 200 may transmit data through a physical uplink shared channel (PUSCH), by using the provided scheduling information. This signal may be received in the pico cell base station as well as in the macro cell base station. As described above, the transmission power of user equipment has been adjusted to satisfy the reception requirement of the pico cell base station. Therefore, the signal received by the macro cell base station may generally have a high error rate, whereas the pico cell base station may get a good reception result.

At step 245, the pico base station 210 may send the information received from the user equipment to the macro base station 205.

Figure 3:
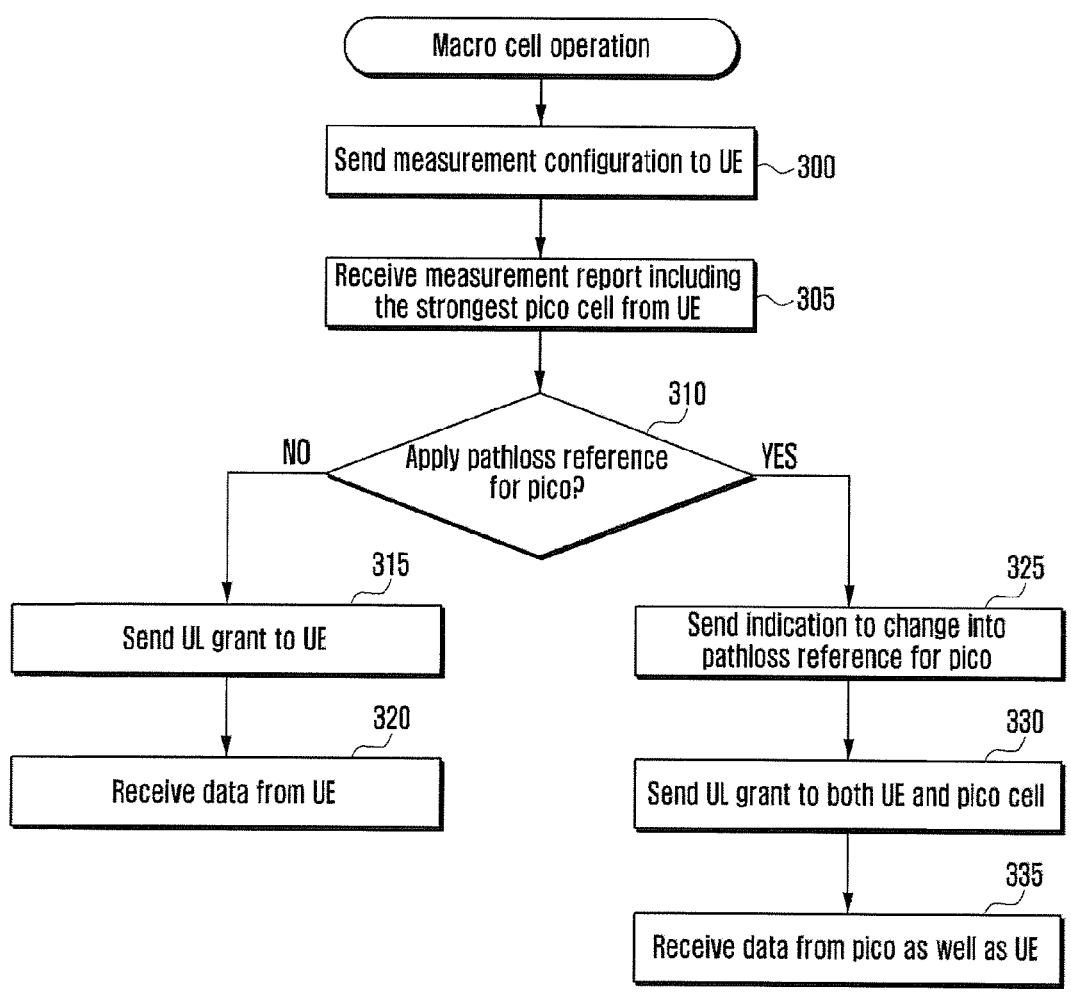
FIG. 3 is a flowchart illustrating a process of controlling an uplink transmission power of user equipment in a macro base station according to an embodiment of the present invention.

FIG. 3 is a flowchart illustrating a process of controlling an uplink transmission power of user equipment in a macro base station according to an embodiment of the present invention.

At step 300, the macro base station 300 may indicate the user equipment 200 to measure the neighboring pico cell. At step 305, the macro base station 300 may receive a report about a cell having the largest signal strength among neighboring pico cells from the user equipment 200.

The step 310 is a step in which the macro base station 205 determines the value of PLc.

That is, on the basis of the reported measurement information, the base station may determine whether to apply the path loss of the forward link of the pico cell as the PLc value used for the calculation of the amount of transmission power of user equipment.

If it is determined that the path loss of the forward link of the pico cell is applied as the PLc value, the macro base station 205 indicates this to the user equipment 200 at step 325. Thereafter, the user equipment 200 may apply the path loss of the pico cell when calculating the uplink transmission power.

At step 330, the macro base station 205 may send scheduling information to the user equipment 200 so that the user equipment 200 may transmit uplink information. At the same time, the macro base station 205 may provide the same scheduling information to the pico base station 210 so that, as described above, the pico cell may receive the signal of corresponding user equipment.

Thereafter, the user equipment 200 may transmit data, through a Physical Uplink Shared Channel (PUSCH), by using provided scheduling information. This signal may be received in the pico cell base station as well as in the macro cell base stations, and the pico cell base station will forward the received signal to the macro cell base station.

At step 335, the pico base station 210 may send the information received from the user equipment to the macro base station 205, and the macro base station 205 may receive it.

In the meantime, if it is determined that the path loss of the forward link of the pico cell is not applied as the PLc value at step 310, the user equipment determines the transmission power by using the path loss value of the forward link of the macro cell, according to the related art. Then, at step 315, the macro base station 205 may provide scheduling information to the user equipment 200, and receive a signal from the user equipment at step 320.

Figure 4:
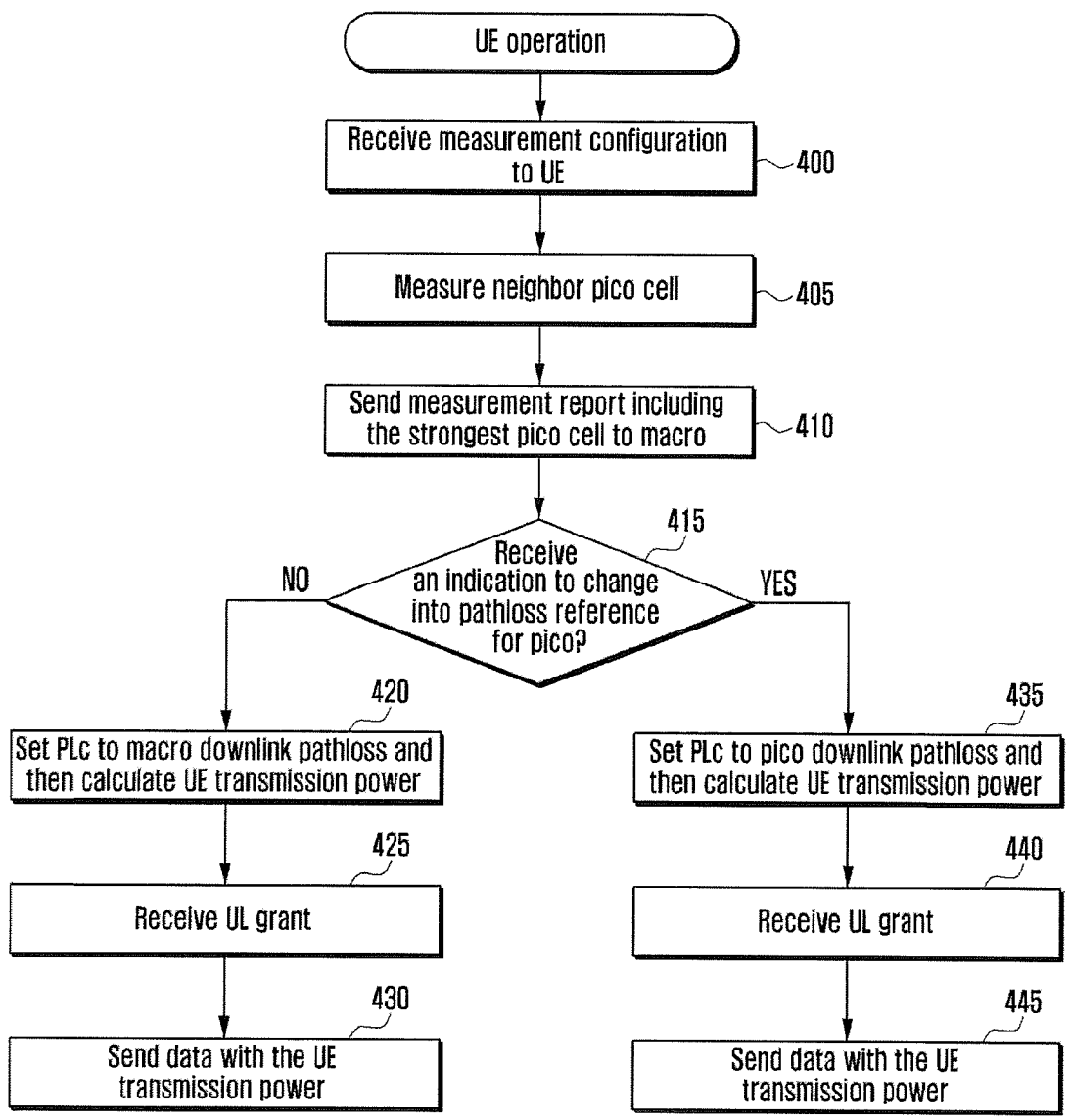
FIG. 4 is a flowchart illustrating a process of controlling an uplink transmission power in an user equipment according to an embodiment of the present invention.

FIG. 4 is a flowchart illustrating a process of controlling an uplink transmission power according to an embodiment of the present invention.

At step 400, an user equipment 400 may receive indication to measure a neighboring pico cell from a base station 405. At step 405, the user equipment 400 may measure neighboring pico cells. In addition, at step 410, the user equipment 400 may report a cell having the largest signal strength to the base station 405.

The step 415 is a step of receiving an indication for PLc from the base station 405.

When receiving an indication to apply the path loss of the forward link of the pico cell from the base station at step 415, the user equipment 400 may apply the path loss of the pico cell to calculate the uplink transmission power at step 435.

In addition, at step 440, the user equipment 400 may receive the scheduling information from the base station 405. After that, at step 445, the user equipment 400 may transmit data through a Physical Uplink Shared Channel (PUSCH) by applying the received scheduling information and the calculated uplink transmission power.

In the meantime, in the case of not receiving an indication relating to an application of the path loss of the forward link of the pico cell from the base station 405 at step 415, the user equipment 400 decides the transmission power by using the path loss value of the forward link of the macro cell, according to the related art, at step 420. Then, the user equipment may be provided with scheduling information from the base station at step 425, and transmit data at step 430.

As shown in FIGS. 2, 3 and 4, the base station 405 according to an embodiment of the present invention may determine whether to use the path loss of a serving cell or the path loss of a neighboring cell which is not a serving cell as the PLc value, on the basis of the report of measurement result of the user equipment, to notify to the user equipment. In addition, the user equipment 400 may determine a reverse transmission output by using the path loss indicated by the base station.

According to an embodiment of the present invention, the user equipment may basically determine the reverse transmission output by applying the path loss of the serving cell. However, when the base station indicates the user equipment to determine the reverse transmission output by applying the path loss of a specific cell which is not a serving cell, the user equipment may determine the reverse transmission output by applying the path loss of the specific cell not a serving cell from a corresponding point of time.

Figure 5:
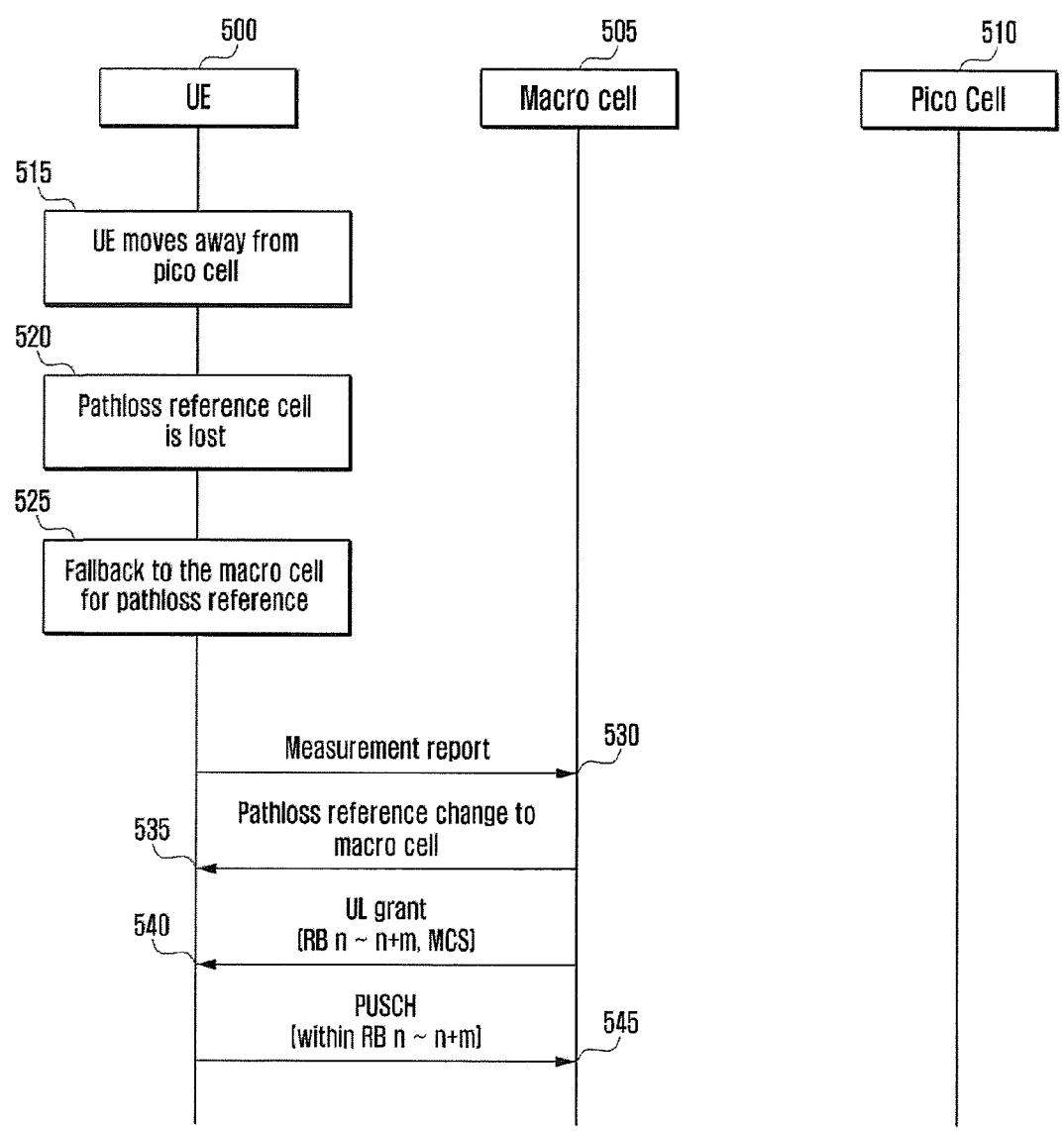
FIG. 5 is a flowchart illustrating a process of changing a path loss value to a forward path loss value of a macro base station when an user equipment is separated from a first neighboring base station.

FIG. 5 is a flowchart illustrating a process of changing a path loss value to a forward path loss value of a macro base station when an user equipment is separated from a first neighboring base station.

The user equipment is not fixed in one place, but moves to another place. Accordingly, even if the user equipment applies the value of specific pico cell as a path loss reference value, when the user equipment is separated from the pico cell, the path loss reference should be changed.

FIG. 5 illustrates a diagram for explaining the process of restoring the path loss reference to the forward path loss of the macro cell when the user equipment is separated from the pico cell.

When the user equipment 500 is separated from the pico cell at step 515, the reception signal of the pico cell becomes very weak at step 520. Even in this case, if the user equipment continuously applies the path loss reference value of the pico cell, the transmission power of the user equipment would be increased.

Accordingly, to prevent this, at step 525, the user equipment 500 may change the PLc value to the forward link path loss value of the macro cell. In addition, the user equipment 500 may calculate the transmission power by using the changed PLc value, and transmit pico cell measurement information to the base station 505 at step 530.

At step 535, the base station 505 may finally indicate the user equipment 500 to apply the forward link path loss of the macro cell as the PLc value.

If the base station 505 provides scheduling information to the user equipment 500 at step 540, then, the user equipment 500 transmits a signal by using the transmission power applying the forward link path loss of macro cell, at step 545.

Figure 6:
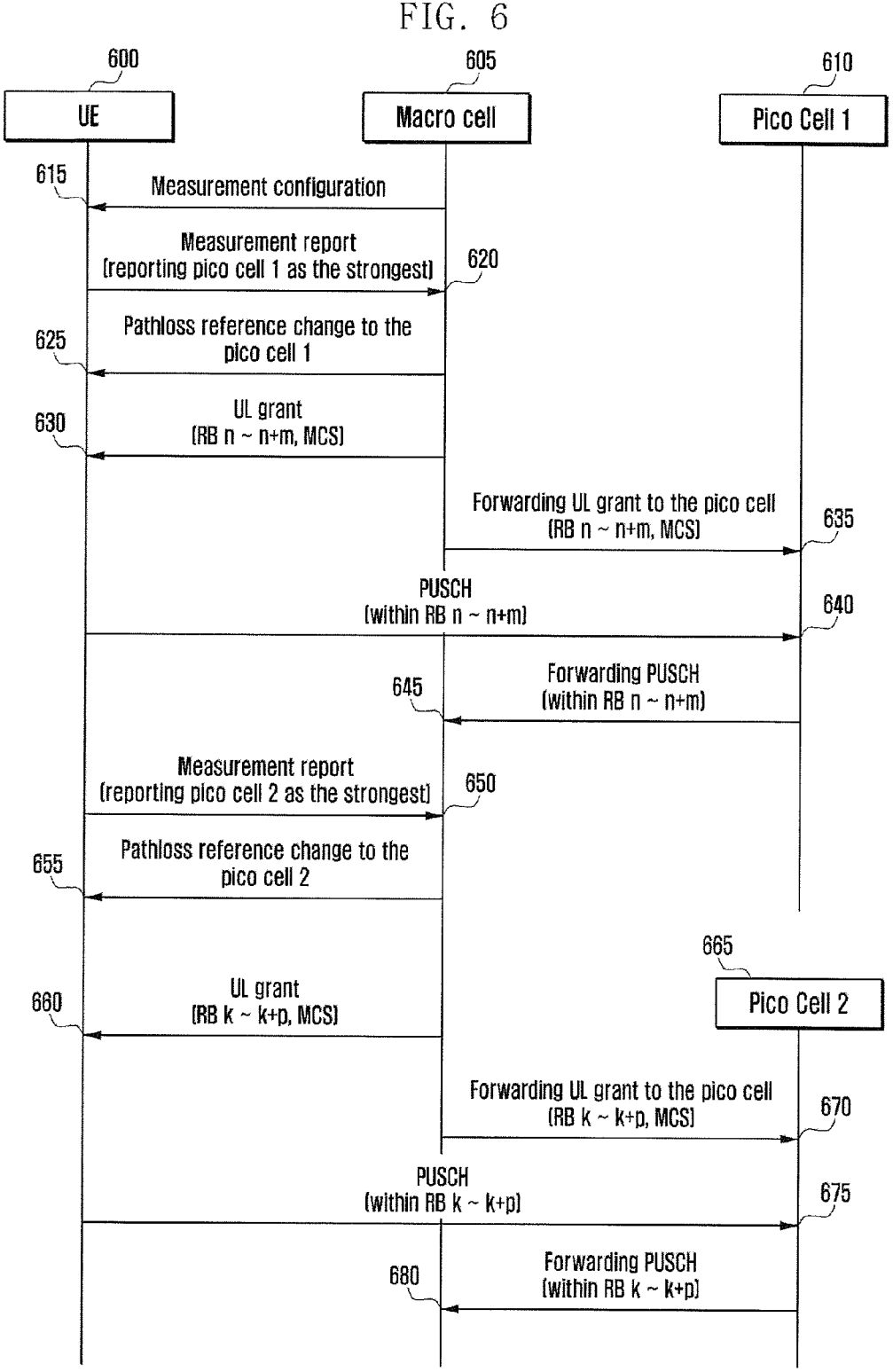
FIG. 6 is a flowchart illustrating a process of changing a path loss value to a forward path loss value of second neighboring base station when an user equipment moves to a contiguous range of a second neighboring base station from a first neighboring base station.

FIG. 6 is a flowchart illustrating a process of changing a path loss value to a forward path loss value of second neighboring base station when an user equipment moves to a contiguous range of a second neighboring base station from a first neighboring base station.

The user equipment is not fixed in one place, but moves to another place. Accordingly, an user equipment 600 may be separated from a pico cell 610 to move to another pico cell 665. Even in this case, the path loss reference should be changed.

FIG. 6 illustrates a diagram for explaining the process of restoring the path loss reference to the forward path loss of a new small base station 665 when the user equipment 600 moves to the second neighboring base station 665 from the first neighboring base station 610.

Steps 615 to 645 follow the same procedure as previously described in FIG. 2.

The user equipment may continuously measure neighboring cells. Therefore, when the position of the user equipment is changed, the user equipment may find a pico cell that can provide much larger signal strength than the existing pico cell. At operation 650, the user equipment 600 may report the pico cell having the better signal strength to the macro cell base station 605.

If the base station determines to change the value of path loss which is applied to the calculation of transmission power, the base station may inform this to the user equipment at step 655. That is, the base station 605 may indicate the user equipment 200 to change the PLc value into the forward link path loss of the second small base station from the value of first small base station.

Thereafter, the user equipment may use the forward path loss of the new pico cell 665 as the PLc value for the calculation of the transmission power. In addition, the macro cell base station 605 may provide the scheduling information of the user equipment to the new pico cell base station 665, so that the new pico cell base station may receive a signal of corresponding user equipment. Therefore, the scheduling information, provided to the user equipment at step 660, is also provided to the new pico cell at step 670. The user equipment may perform a PUSCH transmission at step 675, and the pico cell base station 665 that received the PUSCH transmission may forward it to the macro cell base station 605, at step 680.

Figure 7:
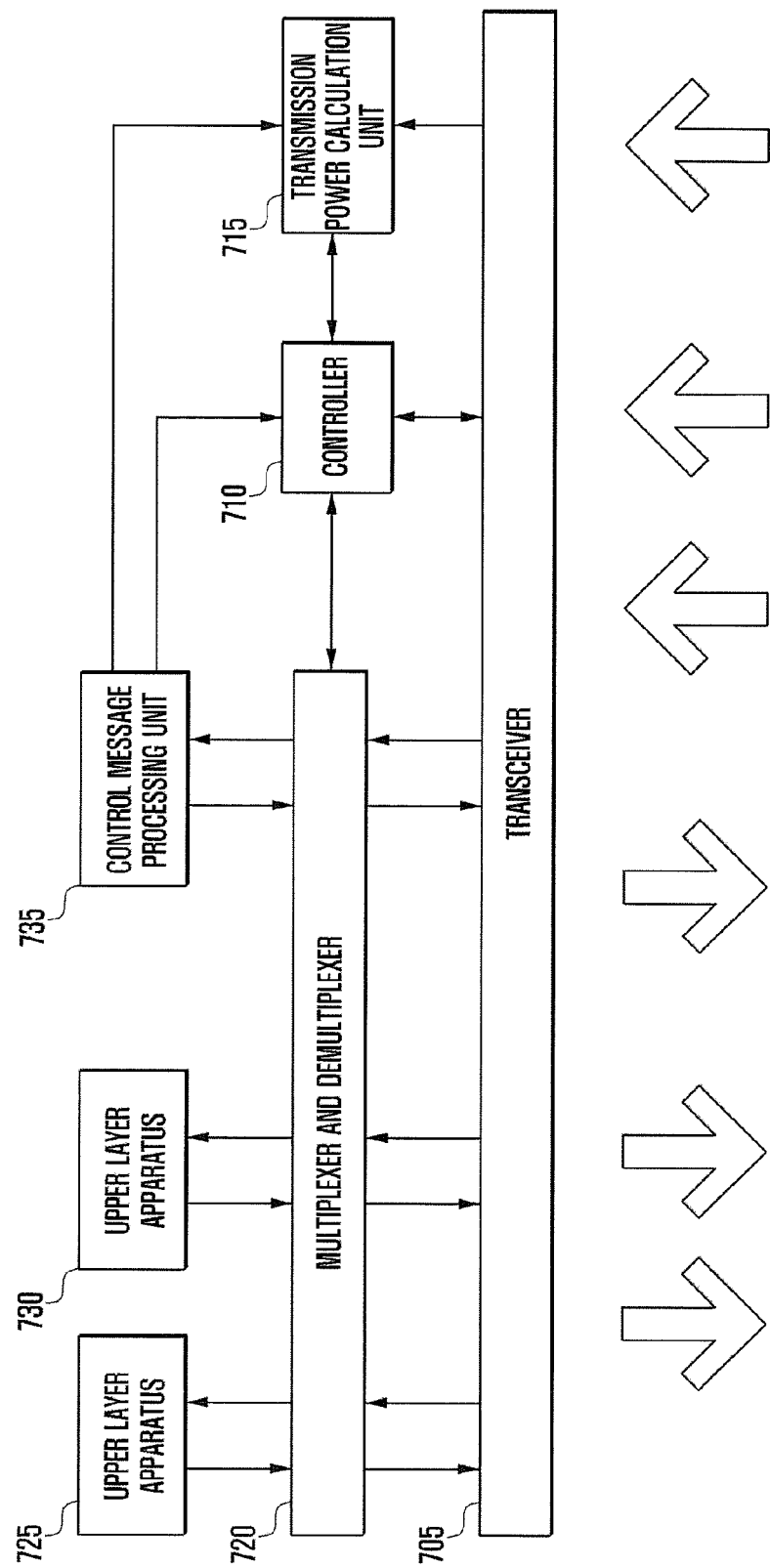
FIG. 7 is a block diagram illustrating a configuration of an user equipment according to an embodiment of the present invention.

FIG. 7 is a block diagram illustrating a configuration of an user equipment according to an embodiment of the present invention.

As shown in FIG. 7, a control device of the user equipment according to an embodiment of the present invention may include a transceiver 705, a transmission power calculation unit 715, a controller 710, a multiplexer and demultiplexer 720, a control message processing unit 735, and various types of upper layer apparatus 725 and 730. The transceiver 705 may receive data and a certain control signal through forward carrier and transmit data and a certain control signal through reverse carrier.

The controller 710 may indicate the multiplexer and demultiplexer to configure a MAC PDU according to a control signal provided by the transceiver, e.g., scheduling information indicated by a reverse direction grant. Then, when receiving an indication for an application of path loss reference from the macro base station, the controller 710 may indicate to calculate transmission power by applying the forward path loss of the pico cell or the forward path loss of the macro cell according to a corresponding indication. The corresponding indication may be determined by using an indicator of the base station sent from the control message processing unit 735.

The transmission power calculation unit 715 may calculate an user equipment transmission output under control of the controller 710 and send the calculated value to the controller. The multiplexer and demultiplexer 720 may multiplex data occurred in the upper layer apparatus 725 and 730 or in the control message processing unit 735, or demultiplex data received in the transceiver 705 to send to a suitable upper layer apparatus or the control message processing unit.

The control message processing unit 735 may process a control message transmitted by a network to handle a necessary operation. For instance, the control message processing unit 735 may send measurement configuration information received in the control message to the controller, or send measurement information to the transceiver, so that the carriers are set in the transceiver. The upper layer apparatus 725 and 730 may be configured according to each service, and may process data generated in an user service such as FTP or VoIP to send to multiplexer or may process data sent from the demultiplexer to send to the service application of the upper layer.

Although embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

The invention claimed is:

1. A method by a serving base station for controlling uplink transmission power of a user equipment, comprising:
   receiving from the user equipment a signal measurement report for a first neighboring base station transmitting the strongest signal to the user equipment;
   transmitting to the user equipment a control signal including path loss information for calculating the uplink transmission power;
   transmitting to the user equipment and the first neighboring base station scheduling information for the user equipment; and
   receiving from the first neighboring base station, an uplink signal of the user equipment.

2. The method of claim 1, wherein transmitting to the user equipment a control signal comprises transmitting a control signal indicating to apply path loss information of a forward channel of the first neighboring base station as the path loss information.

3. The method of claim 2, wherein transmitting to the user equipment and the first neighboring base station scheduling information comprises transmitting the scheduling information to the first neighboring base station in order that the first neighboring base station receives an uplink signal of the user equipment.

4. The method of claim 3, before receiving from the user equipment a signal measurement report, further comprising transmitting to the user equipment a control signal including an instruction of neighboring base station measurement.

5. The method of claim 4, after receiving from the first neighboring base station an uplink signal of the user equipment, further comprising:
   receiving from the user equipment a signal re-measurement report for the first neighboring base station, when the user-equipment is separated from a contiguous range of the first neighboring base station;
   transmitting to the user equipment a control signal indicating to change the path loss information into path loss information of forward channel of a serving base station; and transmitting the scheduling information of user equipment to the user equipment.

6. The method of claim 4, after receiving from the first neighboring base station an uplink signal of the user equipment, further comprising:
receiving from the user equipment a signal measurement report for a second neighboring base station, when the user equipment moves from the first neighboring base station to a contiguous range of the second neighboring base station;
transmitting to the user equipment a control signal indicating to change the path loss information into path loss information of forward channel of the second neighboring base station;
transmitting the scheduling information of user equipment to the user equipment and the second neighboring base station; and
receiving, from the second neighboring base station, an uplink signal of the user equipment.

7. A method for controlling uplink transmission power of user equipment, comprising:
transmitting, to a serving base station, a signal measurement report for a first neighboring base station transmitting the strongest signal to the user equipment;
receiving from the serving base station a control signal including path loss information for calculating the uplink transmission power;
calculating the uplink transmission power by applying the path loss information;
receiving scheduling information from the serving base station; and
transmitting an uplink signal by applying the uplink transmission power.

8. The method of claim 7, wherein the control signal indicates to apply path loss information of forward channel of the first neighboring base station as the path loss information.

9. The method of claim 8, before transmitting to a serving base station a signal measurement report, further comprising:
receiving a control signal including an instruction of neighboring base station measurement; and
measuring a signal of neighboring base station.

10. The method of claim 9, after transmitting an uplink signal, further comprising:
changing the path loss information into path loss information of forward channel of a serving base station, when the user equipment is separated from a contiguous range of the first neighboring base station;
transmitting, to the serving base station, a signal re-measurement report for the first neighboring base station; and
receiving, from the serving base stations a control signal indicating to change the path loss information into path loss information of forward channel of serving base station.

11. The method of claim 9, after transmitting an uplink signal, further comprising:
transmitting, to the serving base station, a signal measurement report for a second neighboring base station, when the user equipment moves from the first neighboring base station to a contiguous range of the second neighboring base station;
receiving, from the serving base station, a control signal indicating to change the path loss information into a path loss information of forward channel of the second neighboring base station;
calculating the uplink transmission power by applying the changed path loss information; and transmitting an uplink signal by applying the calculated uplink transmission power.

12. An apparatus for a serving base station controlling uplink transmission power of user equipment, comprising:
a transceiver to transmit and receive a signal to/from an user equipment; and
a controller to control to receive from the user equipment a signal measurement report with respect to a first neighboring base station, which transmits the strongest signal to the user equipment, transmit to the user equipment a control signal including a path loss information, which is to be used for calculating the uplink transmission power, transmit to the user equipment and the first neighboring base station scheduling information with respect to the user equipment, and receive from the first neighboring base station an uplink signal of the user equipment.

13. The apparatus of claim 12, wherein the controller controls to transmit a control signal indicating to apply path loss information of forward channel of the first neighboring base station as the path loss information.

14. The apparatus of claim 13, wherein the controller controls to transmit the scheduling information to the first neighboring base station in order that the first neighboring base station receives an uplink signal of the user equipment.

15. The apparatus of claim 14, wherein the controller controls to transmit to the user equipment a control signal including an instruction of neighboring base station measurement.

16. The apparatus of claim 15, wherein the controller controls to receive from the user equipment a signal re-measurement report for the first neighboring base station, when the user equipment is separated from a contiguous range of the first neighboring base station, transmit to the user equipment a control signal indicating to change the path loss information into a path loss information of forward channel of a serving base station, and transmit the scheduling information of user equipment to the user equipment.

17. The apparatus of claim 15, wherein the controller controls to receive from the user equipment a signal measurement report for a second neighboring base station, when the user equipment moves from the first neighboring base station to a contiguous range of the second neighboring base station, transmit to the user equipment a control signal indicating to change the path loss information into a path loss information of forward channel of the second neighboring base station, transmit the scheduling information of user equipment to the user equipment and the second neighboring base station, and receive from the second neighboring base station an uplink signal of the user equipment received by the second neighboring base station.

18. An apparatus for controlling uplink transmission power in user equipment, comprising:
a transceiver to transmit and receive a signal to/from a base station and perform signal measurement with respect to a serving base station or a neighboring base station; and
a controller to control to transmit to the serving base station a signal measurement report with respect to a first neighboring base station which transmits the strongest signal to the user equipment, receive from the serving base station a control signal including a path loss information which is to be used for calculating the uplink transmission power, calculate the uplink transmission power by applying the path loss information, receive scheduling information from the serving base station, and transmit an uplink signal by applying the uplink transmission power.

19. The apparatus of claim 18, wherein the control signal indicates to apply a path loss information of forward channel of the first neighboring base station as the path loss information.

20. The apparatus of claim 19, wherein the controller controls to receive a control signal including an instruction of neighboring base station measurement, and measure a signal of neighboring base station.

21. The apparatus of claim 20, wherein the controller controls to change the path loss information into a path loss information of forward channel of a serving base station, when the user equipment is separated from a contiguous range of the first neighboring base station, transmit to the serving base station a signal re-measurement report for the first neighboring base station, and receive from the serving base station a control signal indicating to change the path loss information into a path loss information of forward channel of serving base station.

22. The apparatus of claim 20, wherein the controller controls to transmit to the serving base station a signal measurement report for a second neighboring base station, when the user equipment moves from the first neighboring base station to a contiguous range of the second neighboring base station, receive from the serving base station a control signal indicating to change the path loss information into a path loss information of forward channel of the second neighboring base station, calculate the uplink transmission power by applying the changed path loss information, and transmit an uplink signal by applying the calculated uplink transmission power.

* * * * *